United States Patent [19]

Simkowski

[11] Patent Number: 5,522,692
[45] Date of Patent: Jun. 4, 1996

[54] DEVICE AND METHOD FOR PALLETIZING UNSTABLE ARTICLES

[75] Inventor: Donald J. Simkowski, Loveland, Colo.

[73] Assignee: Goldco Industries, Inc., Loveland, Colo.

[21] Appl. No.: 170,048

[22] Filed: Dec. 20, 1993

[51] Int. Cl.⁶ .................................................. B65G 57/00
[52] U.S. Cl. .................................... 414/789.5; 414/791.7; 414/793.4; 414/794.7
[58] Field of Search .............................. 414/789.5, 791.7, 414/793.4, 794.7

[56] References Cited

U.S. PATENT DOCUMENTS

| 2,949,179 | 8/1960 | Busse | 198/30 |
|---|---|---|---|
| 3,389,810 | 6/1968 | Wolfe et al. | 414/791.7 |
| 3,522,890 | 8/1970 | Birchall | 414/791.7 |
| 3,645,410 | 2/1972 | Powell | 414/791.7 |
| 3,682,290 | 8/1972 | Von Gal, Jr. et al. | 414/791.7 |
| 3,685,632 | 8/1972 | Brady | 198/31 |
| 3,788,497 | 1/1974 | Carlson | 215/6 P |
| 3,823,813 | 7/1974 | Holt | 198/76 |
| 3,934,713 | 1/1976 | Vander Meer et al. | 198/34 |
| 3,937,336 | 2/1976 | Carlson | 414/791.7 |
| 4,667,808 | 5/1987 | Mastak | 198/419 |
| 4,748,791 | 6/1988 | Langenbeck | 53/58 |
| 4,759,673 | 7/1988 | Pearce et al. | 414/42 |
| 4,809,965 | 3/1989 | Vander Meer et al. | 271/11 |
| 4,834,605 | 5/1989 | Jerred | 414/791.7 |
| 4,934,508 | 6/1990 | Vander Meer et al. | 198/434 |
| 4,978,275 | 12/1990 | Reid et al. | 414/789.5 |
| 5,074,744 | 12/1991 | Mastak | 414/791.7 |
| 5,203,444 | 4/1993 | Munch . | |
| 5,271,709 | 12/1993 | Vander Meer et al. | 414/791.7 |
| 5,437,533 | 8/1995 | Vander Meer et al. | 414/789.5 |

FOREIGN PATENT DOCUMENTS 0485937  5/1992  European Pat. Off. .

Primary Examiner—David A. Bucci
Assistant Examiner—Douglas A. Hess
Attorney, Agent, or Firm—Robert E. Harris

[57] ABSTRACT

Device and method are disclosed for palletizing unstable articles such as containers. Articles, such as glass or plastic bottles, are conveyed in single file to an accumulating area, with the containers at the accumulating area being formed into a pattern, preferably in nested relationship. A conveyor system is provided to urge articles from the accumulating area to, and partially through, a sweep area, and a movable retainer unit having retractable plungers is provided to control the movement of articles from the accumulating area by groups to the sweep area with the sweep area having a positioner unit thereat that includes a plurality of movable sweep arms adjacent ones of which are utilized to engage the first and last rows of each group of articles to capture each group therebetween and thereafter conduct each group of articles through the sweep area to a pallet loading area where each group is successively deposited as a layer on a pallet.

29 Claims, 18 Drawing Sheets

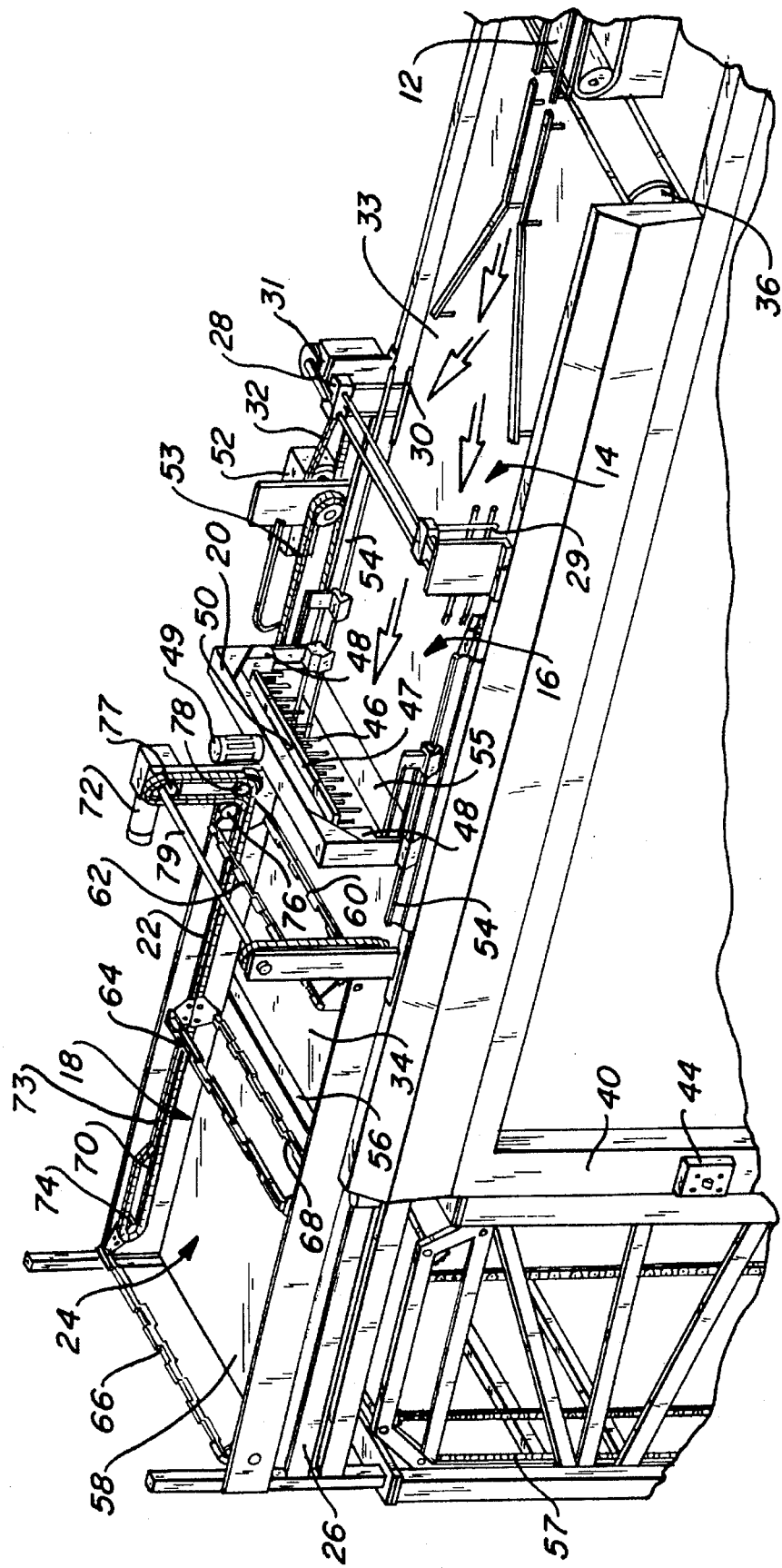
Fig_1

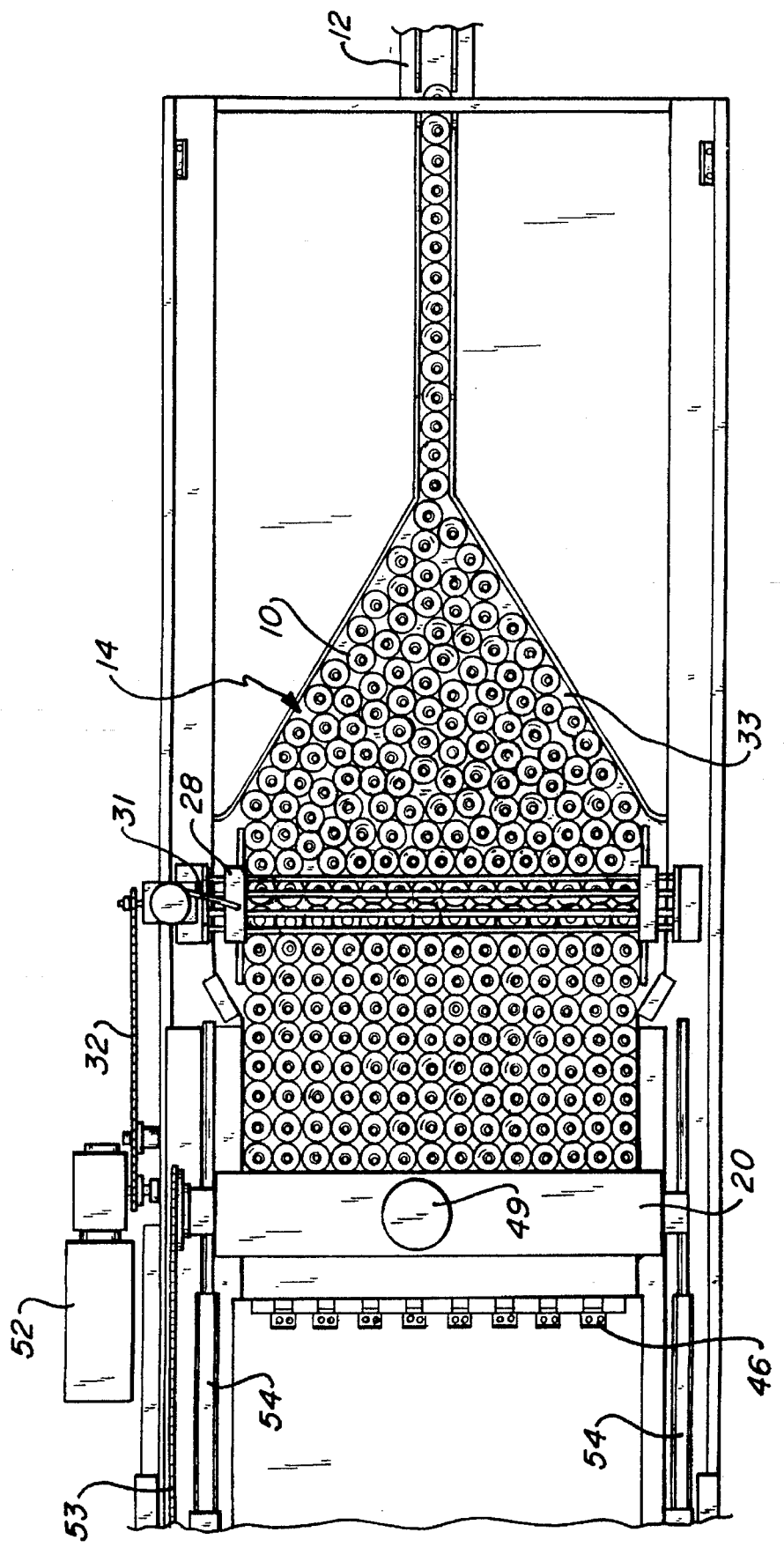

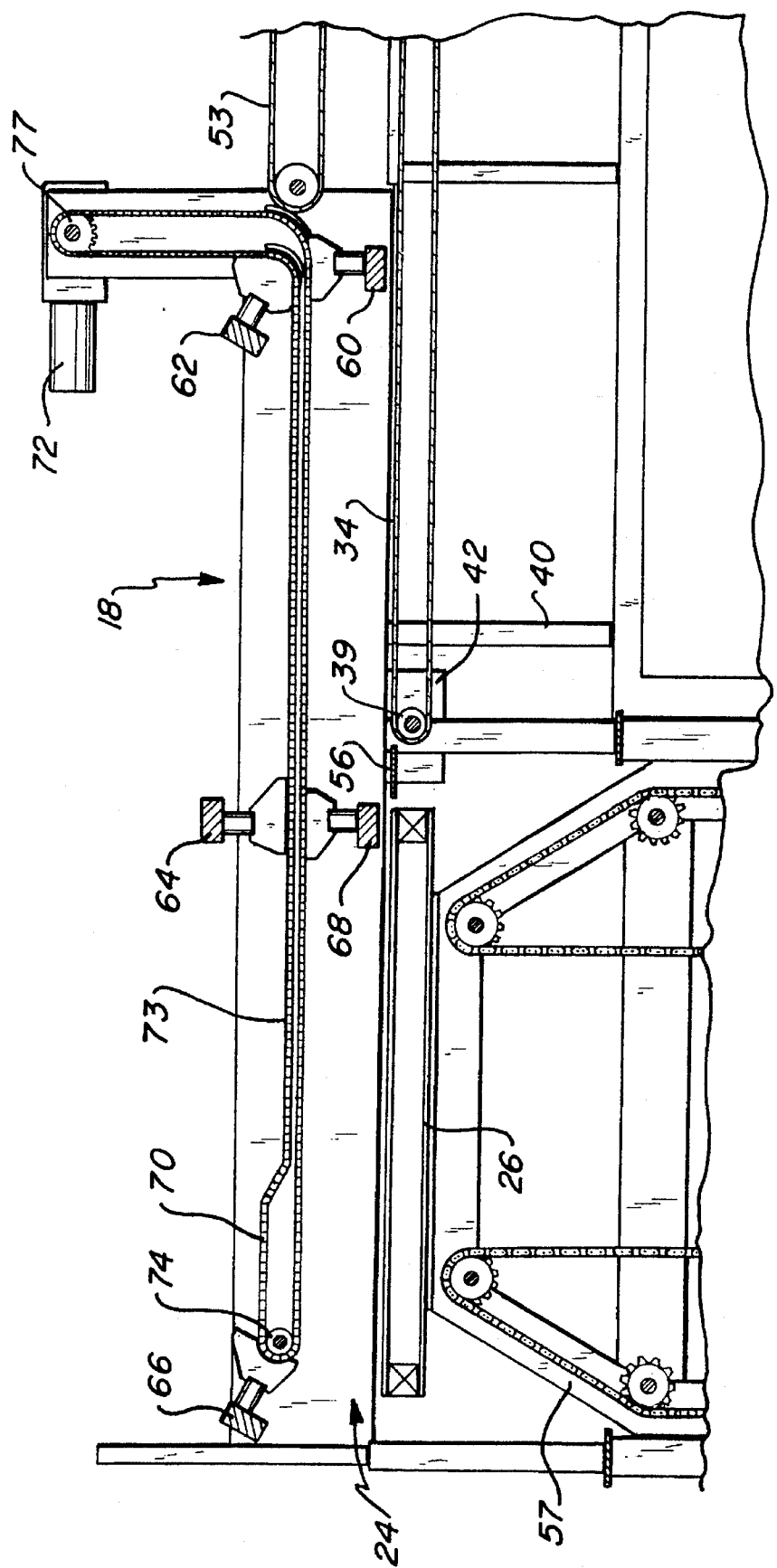

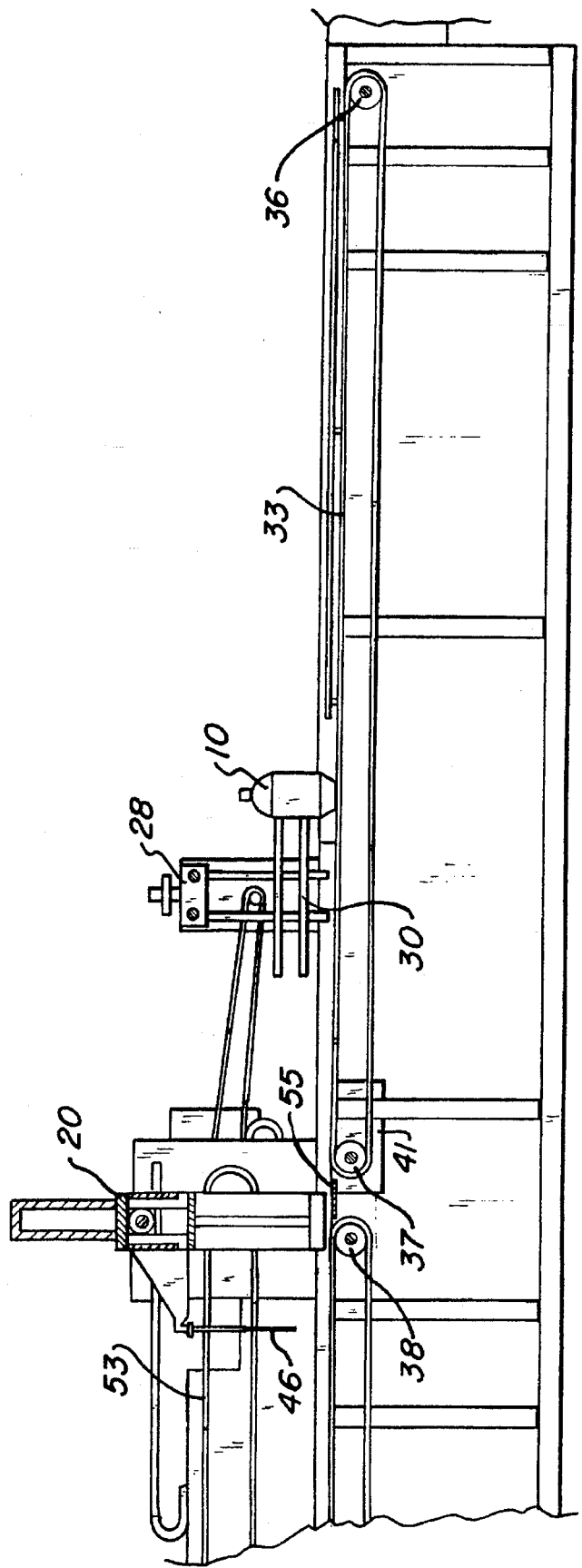
Fig_3B

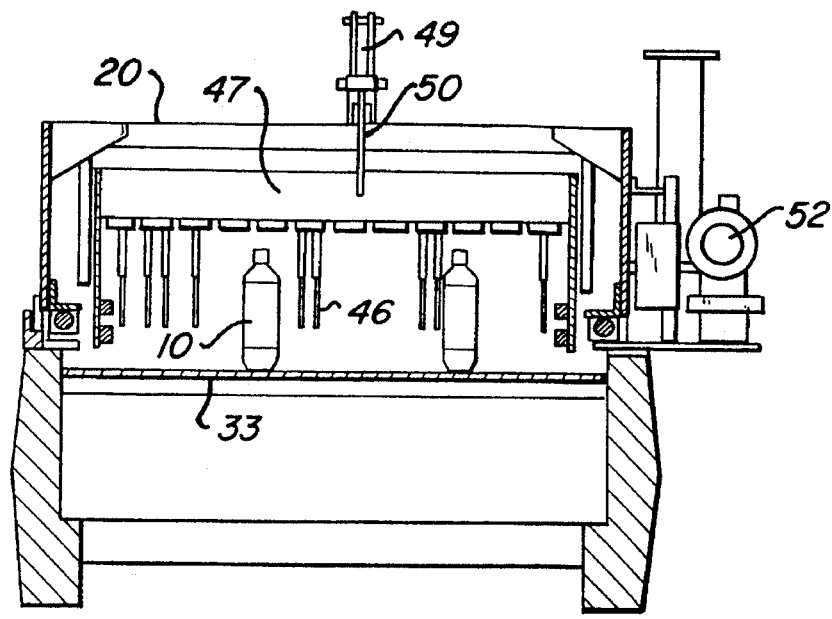
Fig_4
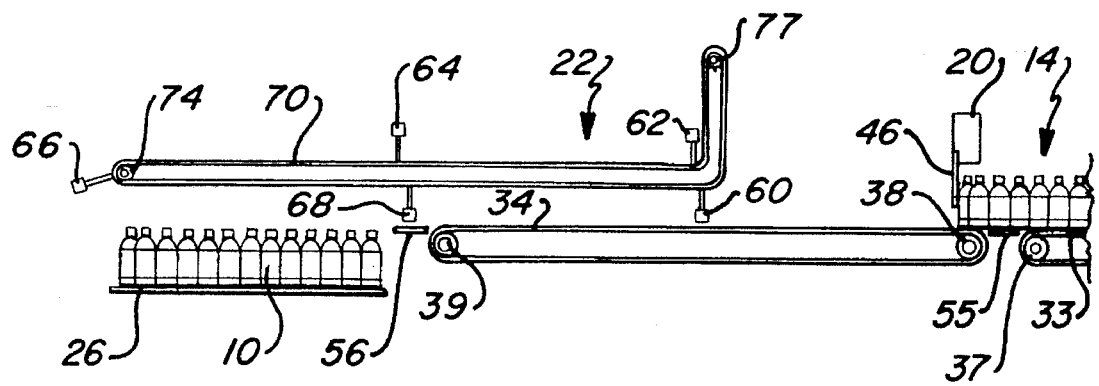
Fig_5A

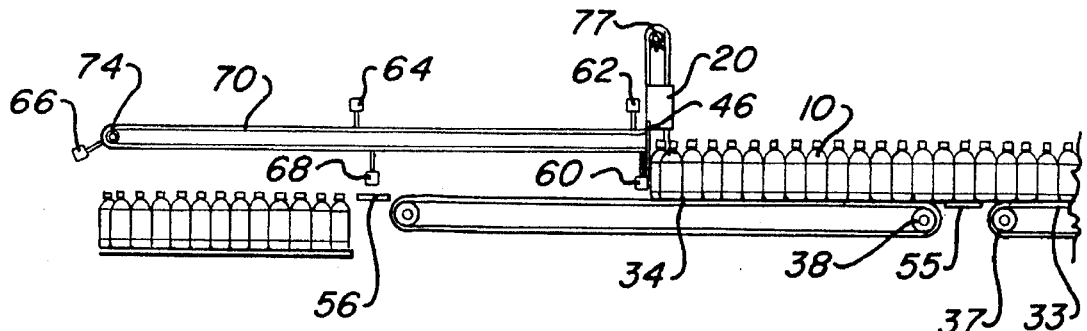
Fig_5B
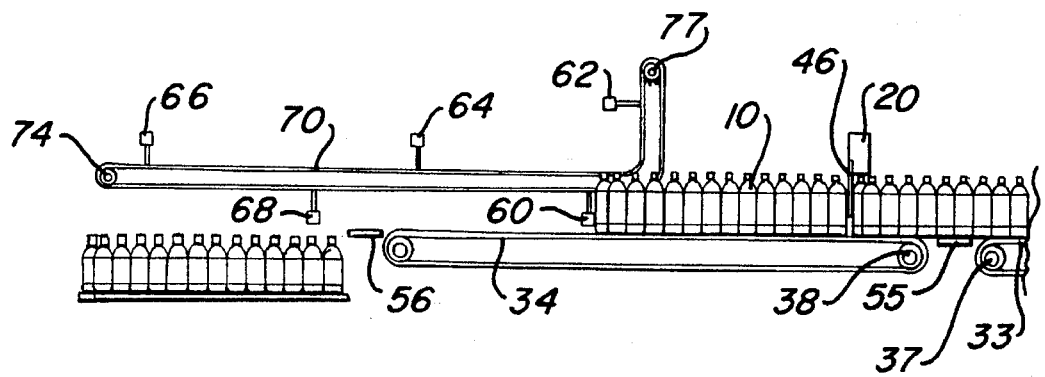
Fig_5C
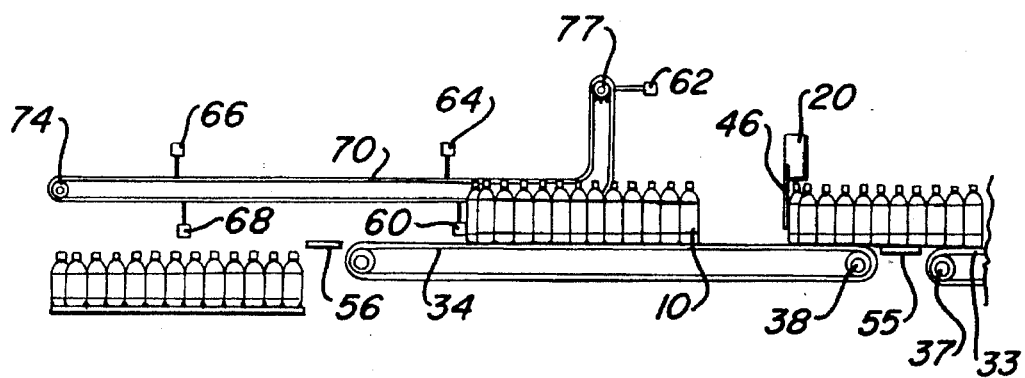
Fig_5D

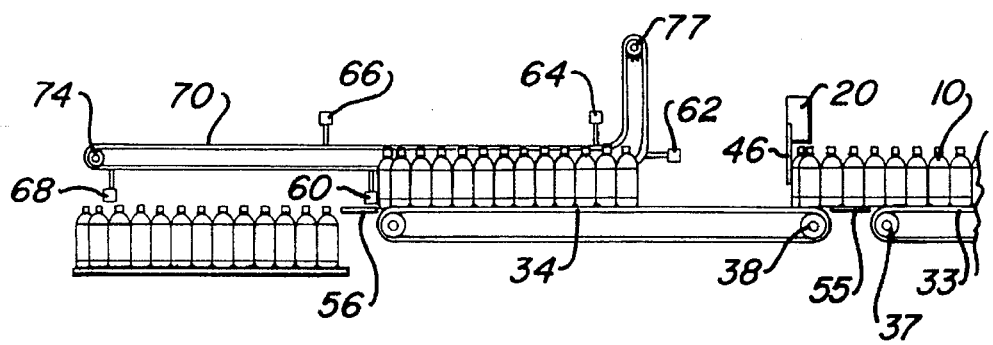
*Fig_5E*
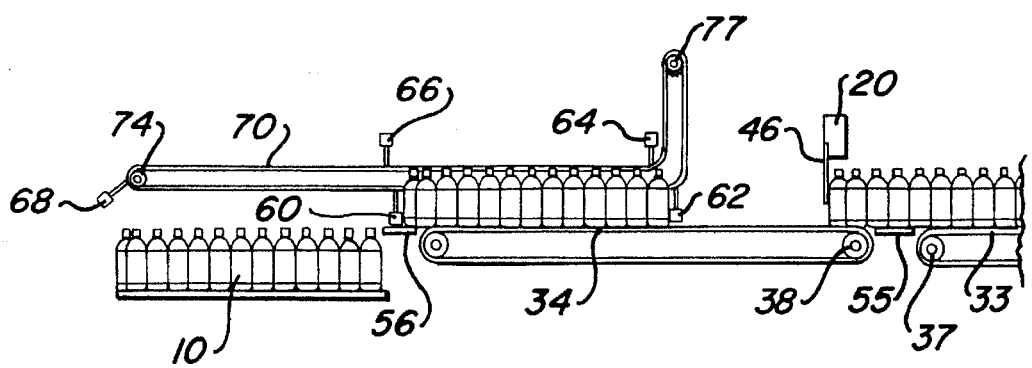
*Fig_5F*
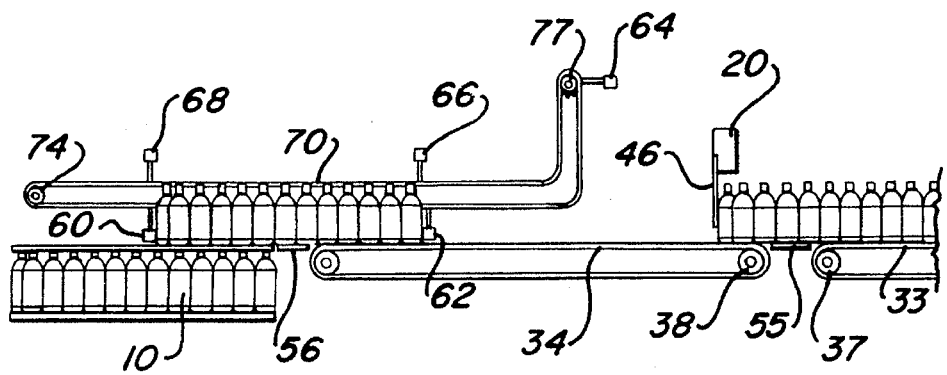
*Fig_5G*

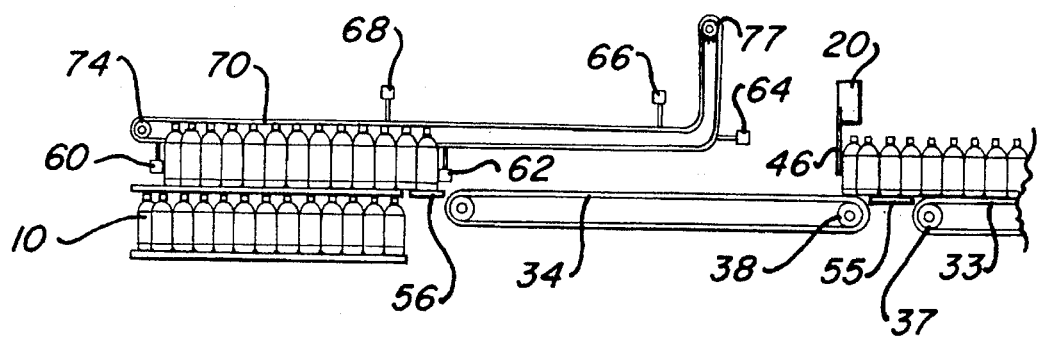
Fig_5H
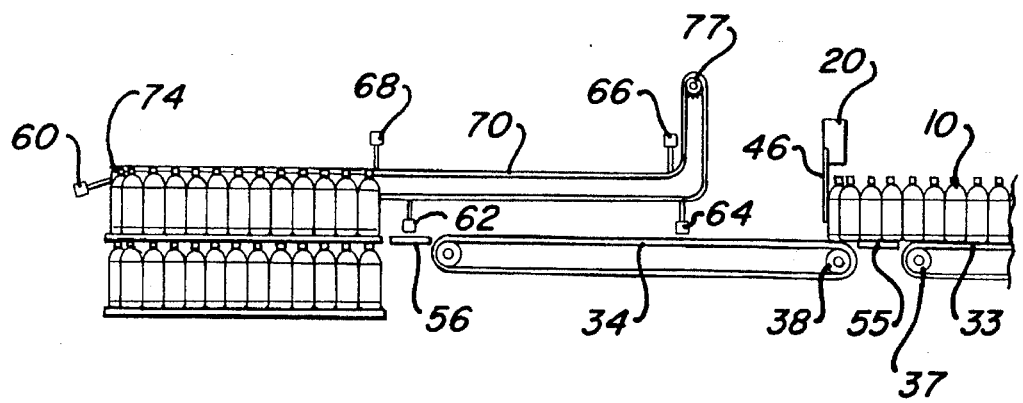
Fig_5I
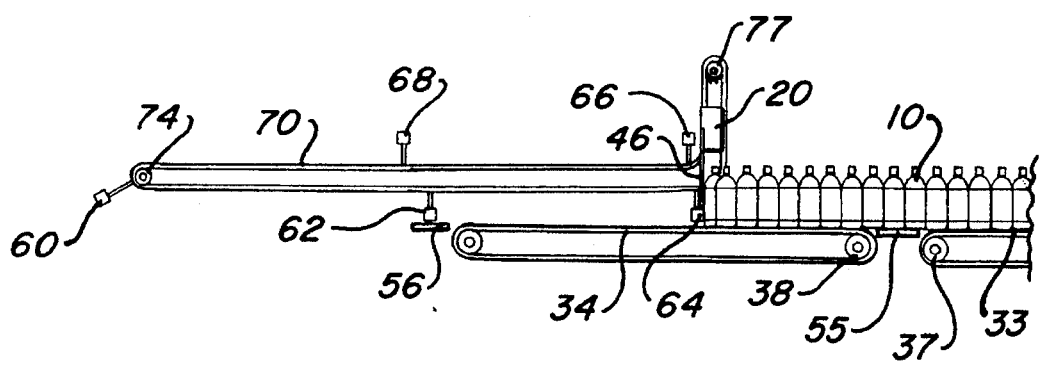
Fig_5J

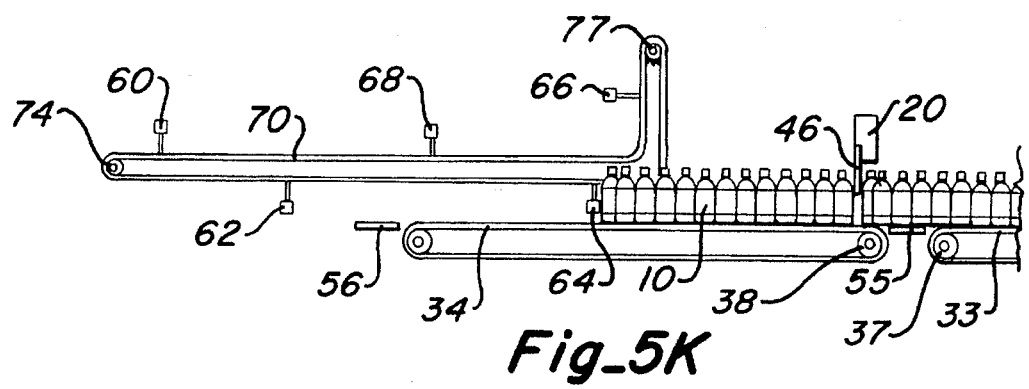
Fig_5K
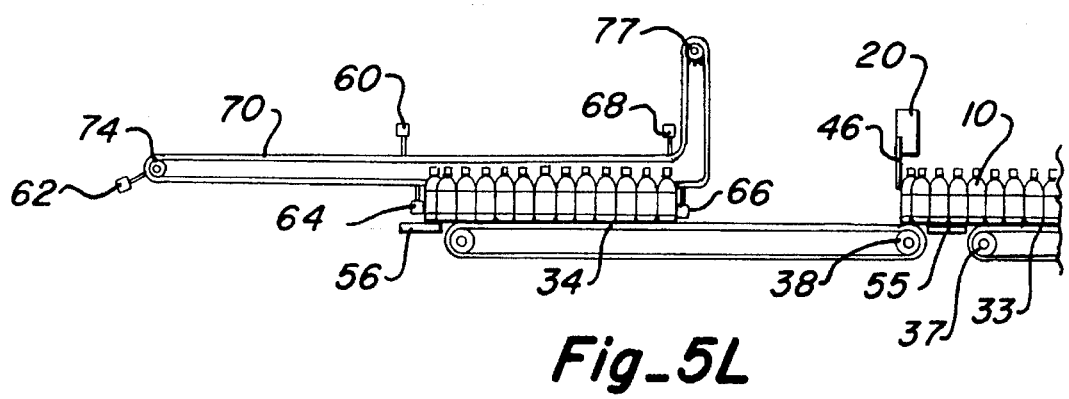
Fig_5L
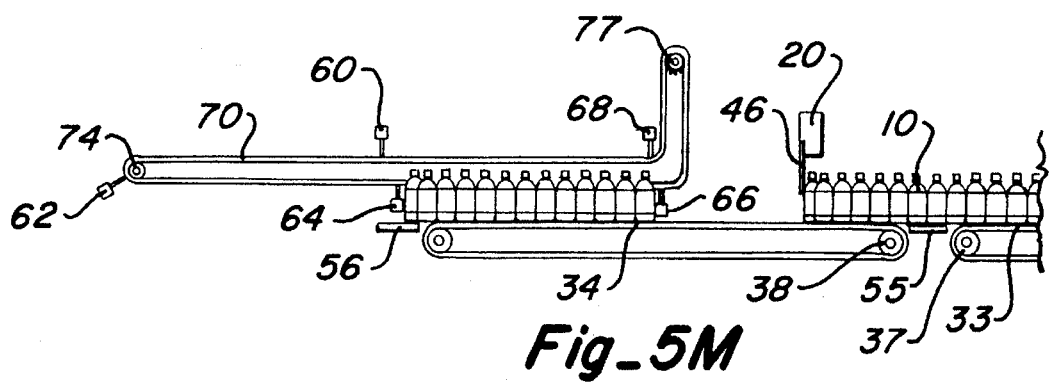
Fig_5M

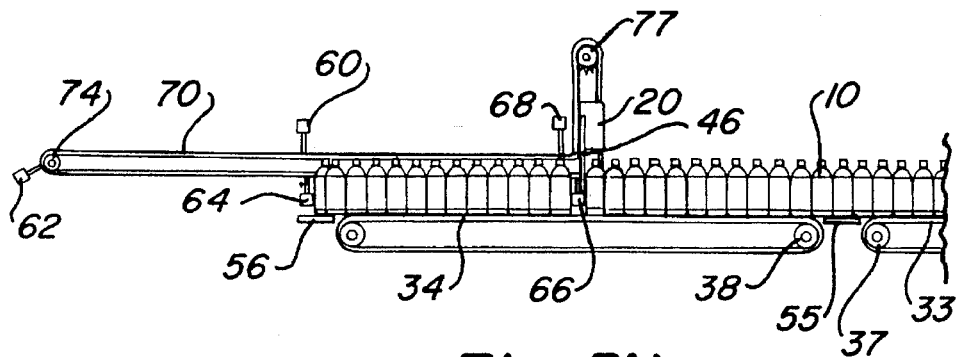
Fig_5N
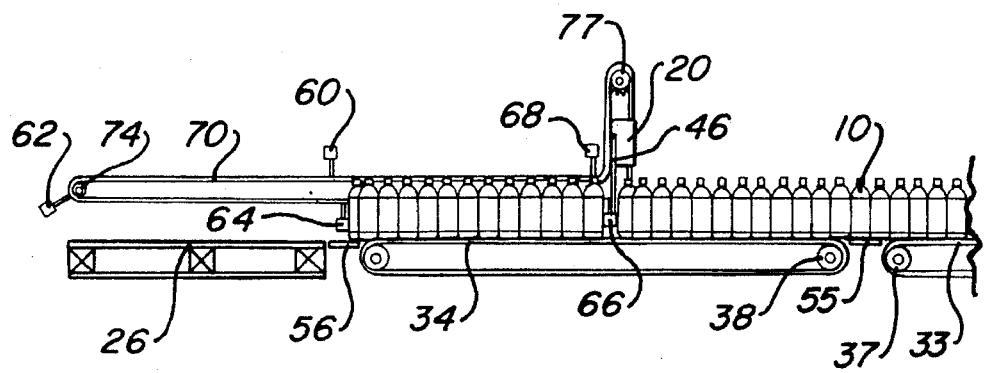
Fig_5P
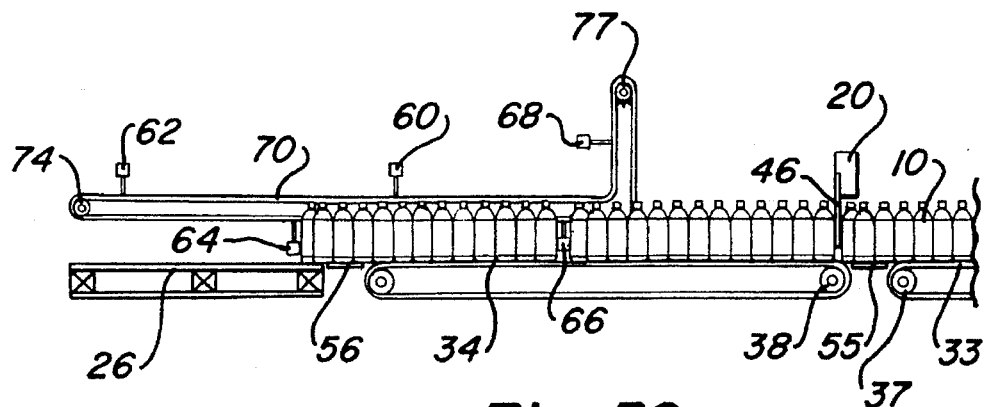
Fig_5Q

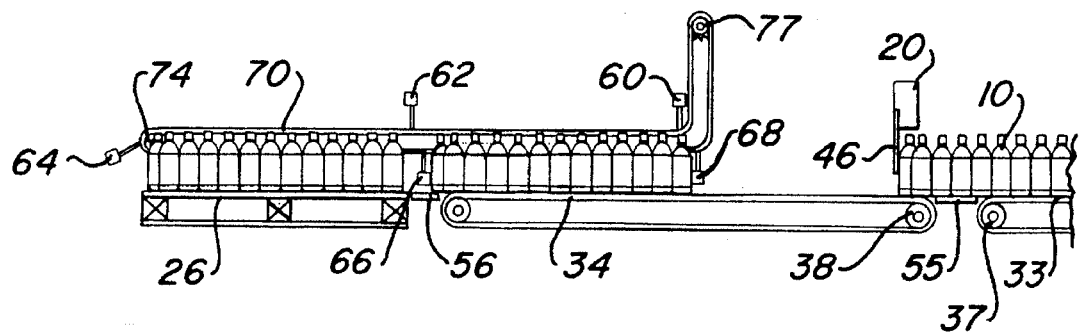
*Fig_5R*
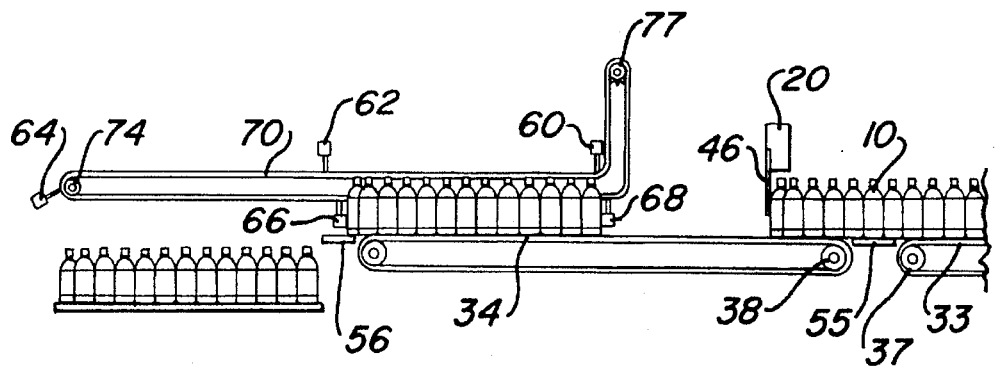
*Fig_5S*
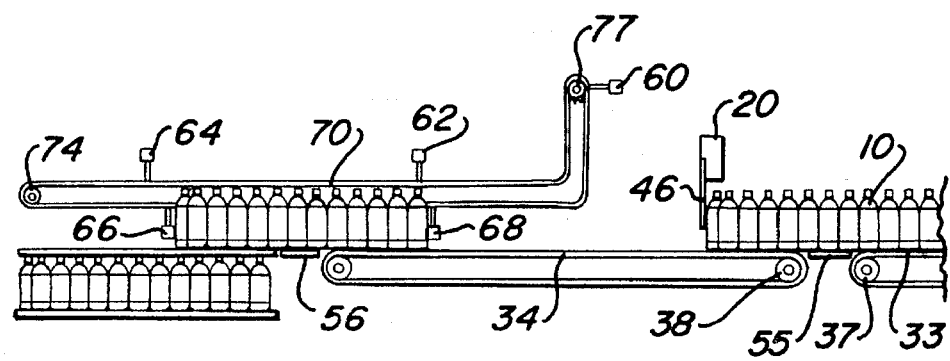
*Fig_5T*

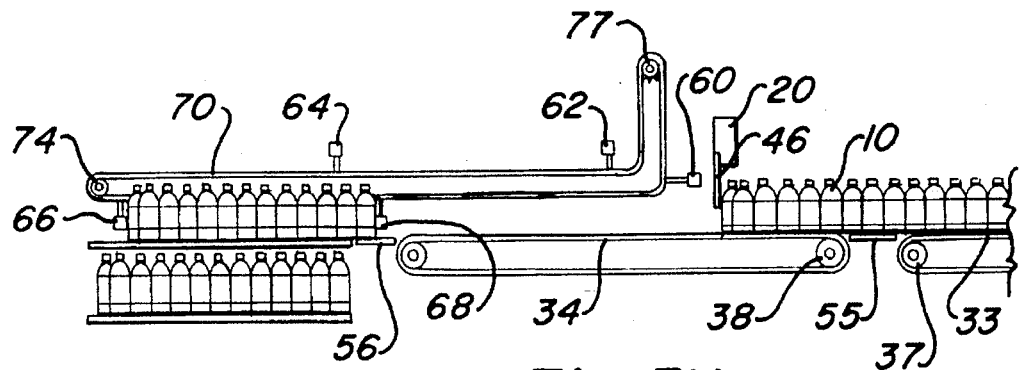
Fig_5U
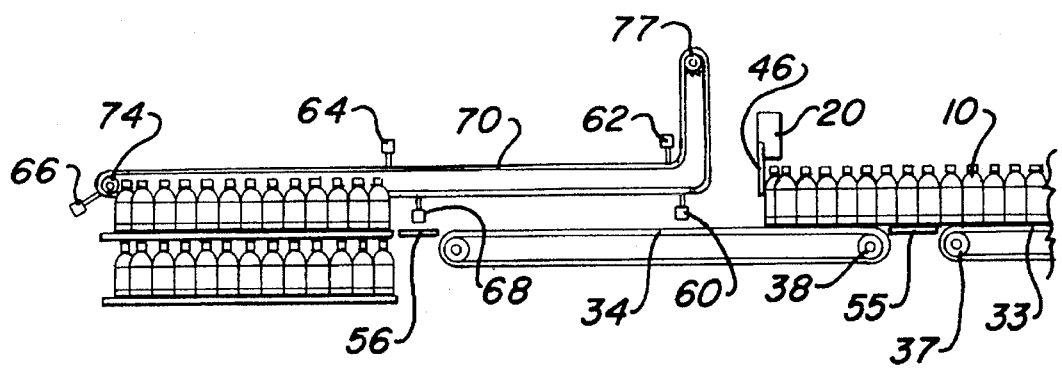
Fig_5V
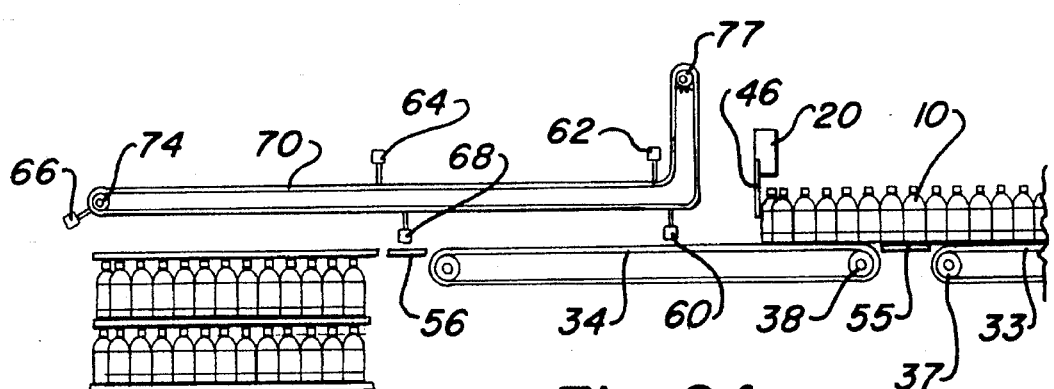
Fig_6A

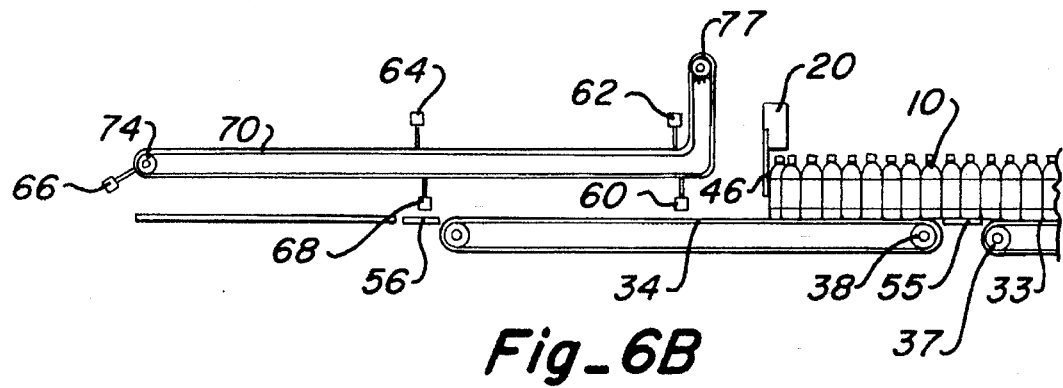
Fig_6B
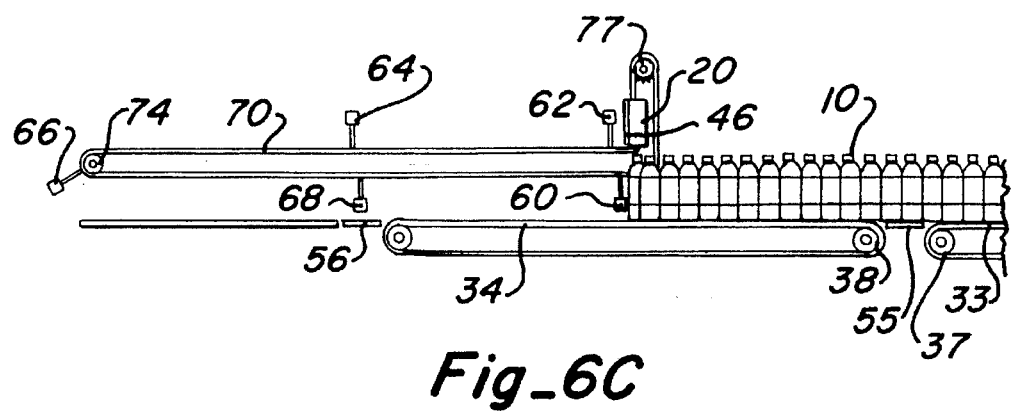
Fig_6C
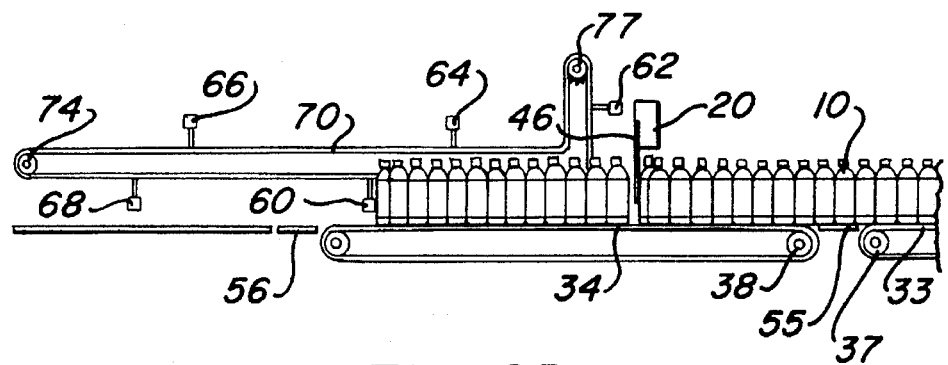
Fig_6D

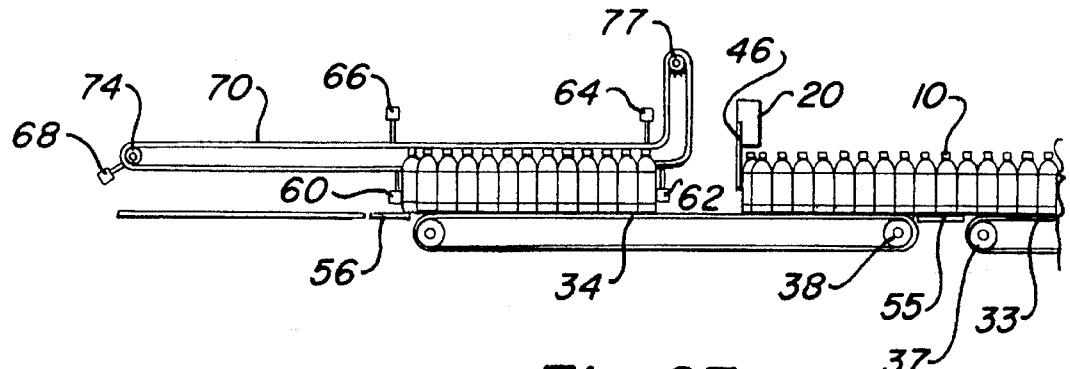
Fig_6E
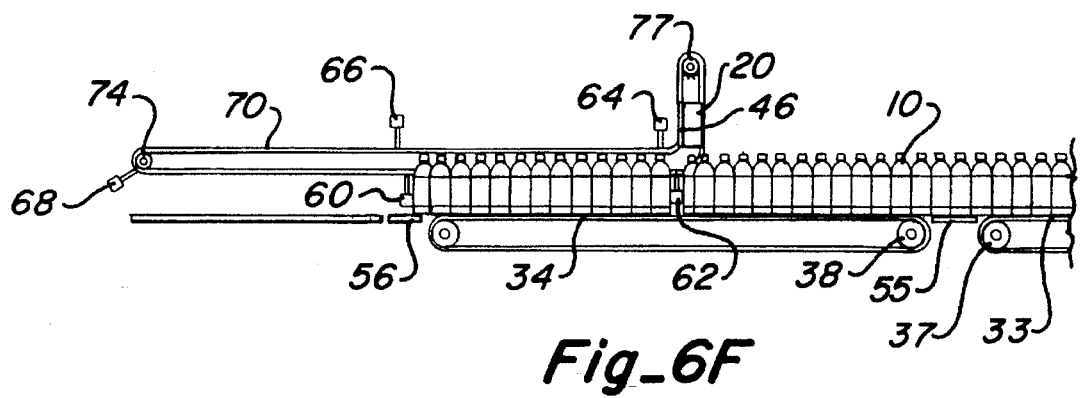
Fig_6F
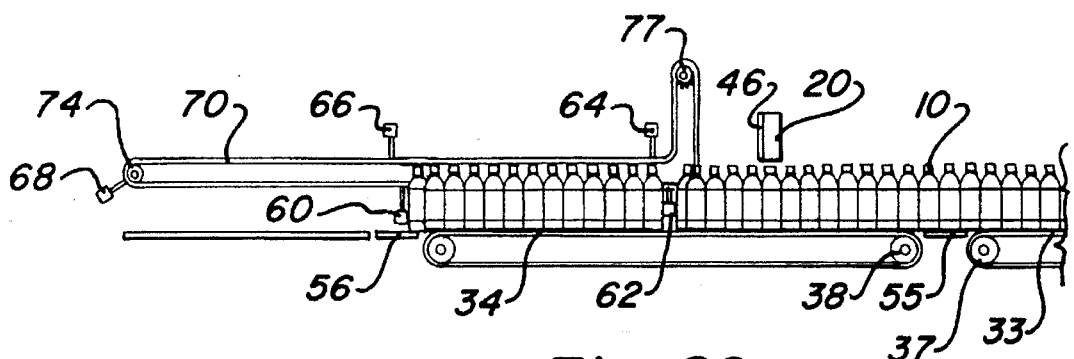
Fig_6G

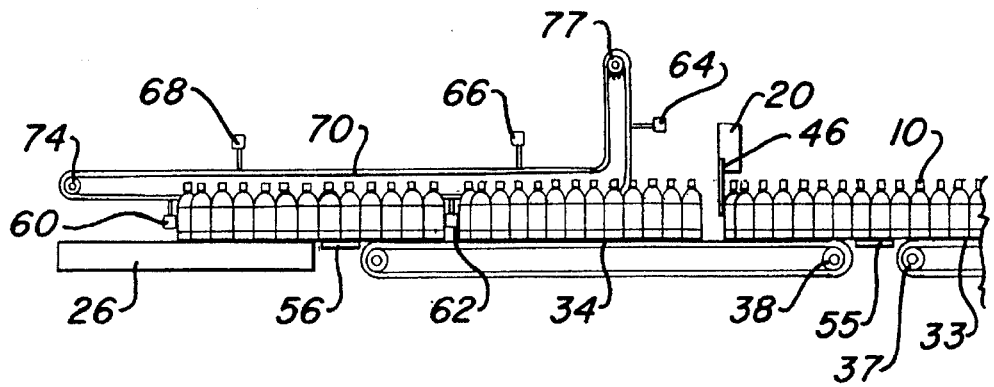
Fig_6H
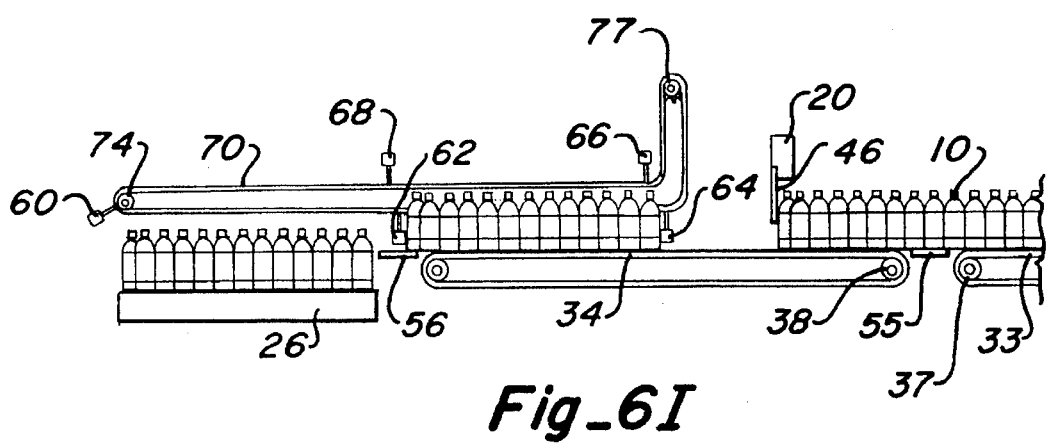
Fig_6I
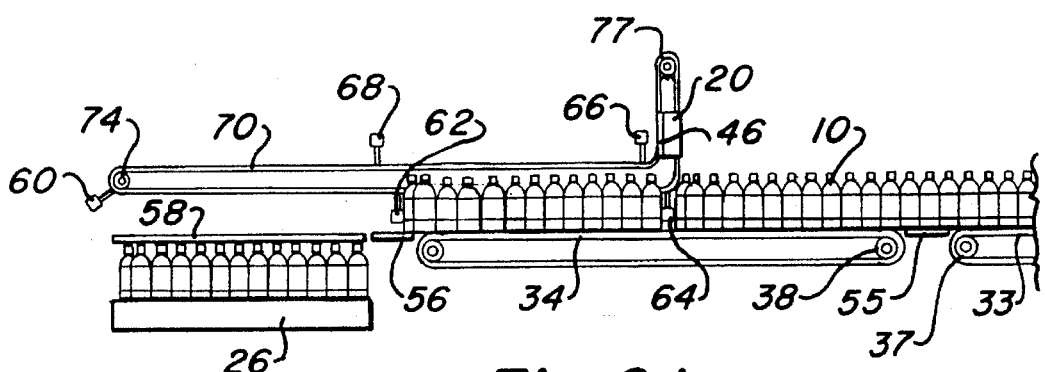
Fig_6J

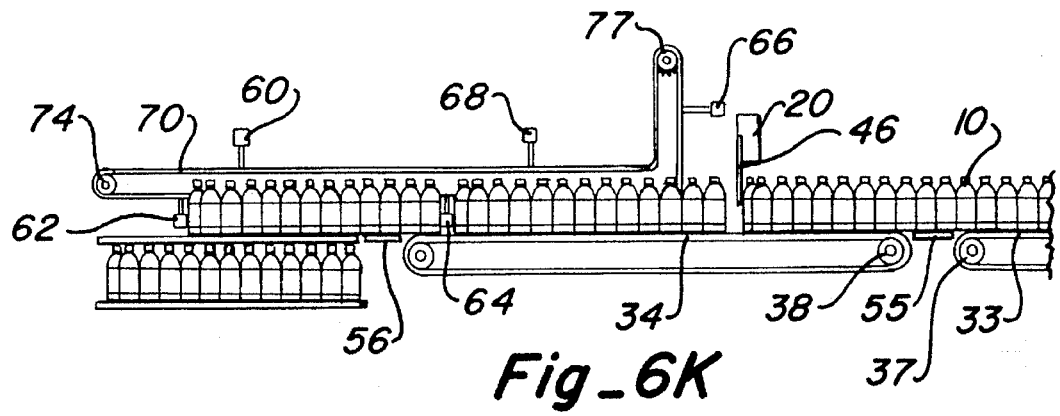
Fig_6K
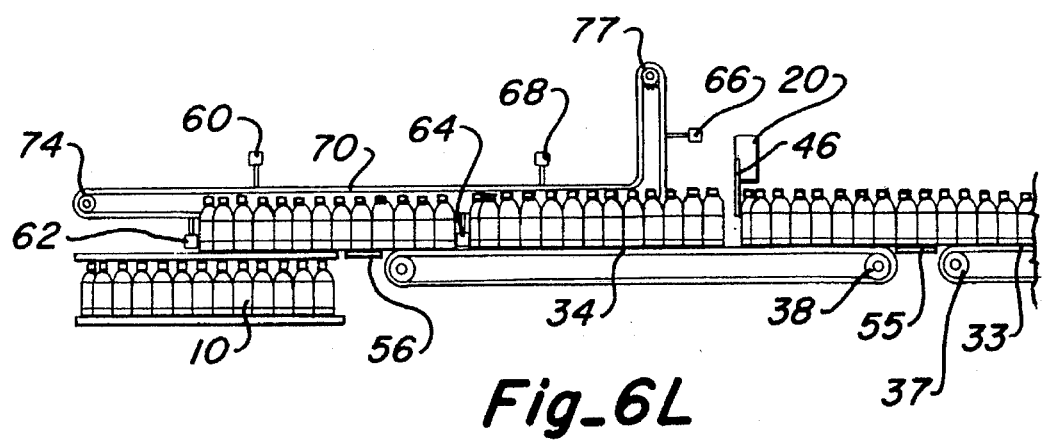
Fig_6L
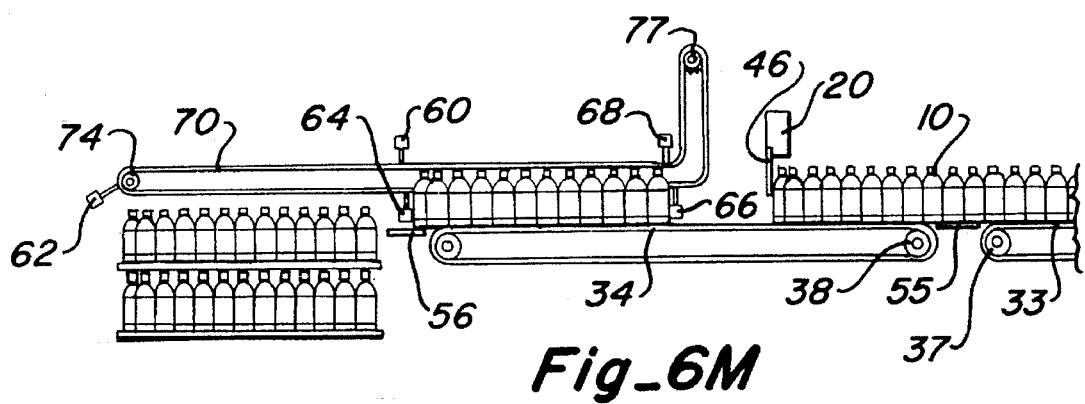
Fig_6M

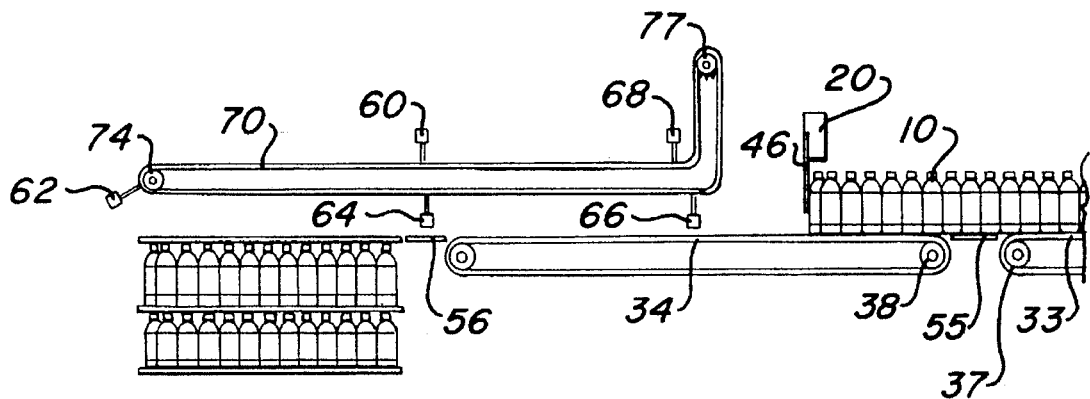
Fig_6N
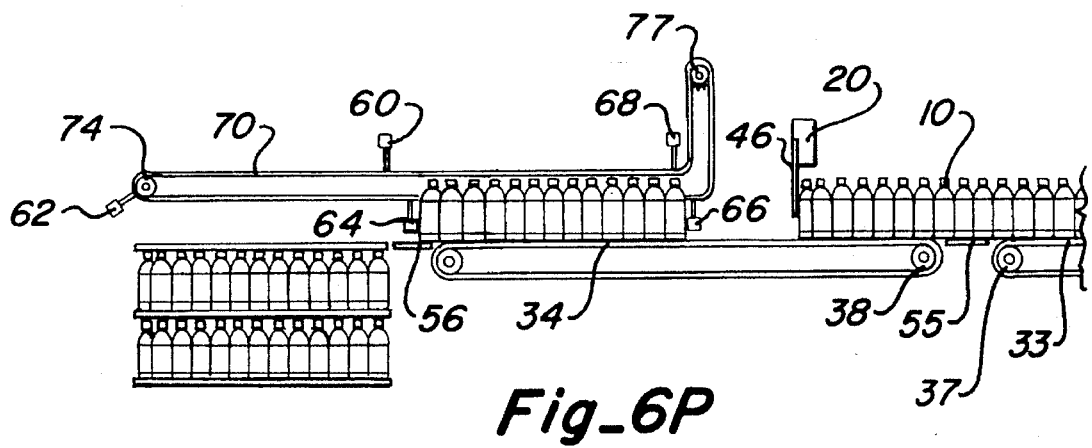
Fig_6P

DEVICE AND METHOD FOR PALLETIZING UNSTABLE ARTICLES

FIELD OF THE INVENTION

This invention relates to palletizing articles, and, more particularly, relates to palletizing unstable articles such as containers.

BACKGROUND OF THE INVENTION

It is oftentimes necessary to convey articles between different locations and/or form the articles into a suitable arrangement for a particular purpose. Where fairly stable articles, such as cylindrical cans or bottles, are to be conveyed from location to location, it is well known that such articles can often be conveyed along a belt from one location to another at a fairly fast rate.

It is also now known that conveyed cylindrical articles such as containers can be formed into a single line (see, for example, U.S. Pat. Nos. 4,500,229, 4,730,955 and Re. 32,684) or formed into a plurality of rows, including being formed into a nested relationship (see U.S. Pat. Nos. 2,535,880, 3,685,632, 4,721,419, 4,834,605 and 4,934,508).

It is likewise known that articles can be repeatedly conveyed by groups, or tiers, of articles to a pallet (see, for example, U.S. Pat. Nos. 4,759,673, 4,834,605 and 4,934,508), and that tiers, of articles can be conveyed to a pallet using a sweep arrangement (see, for example, U.S. Pat. Nos. 3,934,713 and 4,978,275).

It is also known that groups of articles can be stacked in vertical layers on a pallet with a sheet placed between each layer formed by a group of articles (see, for example, U.S. Pat. Nos. 4,759,673 and 4,809,965).

Likewise, it is known that unstable articles can be palletized (see, for example, U.S. Pat. No. 4,667,808).

SUMMARY OF THE INVENTION

This invention provides improved device and method for palletizing articles and, more particularly, relates to palletizing unstable containers at a faster speed than heretofore possible.

The device includes accumulating means, conveying means for conveying articles through an accumulating area and a sweep area, retainer means to repeatedly allow groups having a preselected number of articles to pass from the accumulating area to the sweep area with the retainer means leading each group of articles from the accumulating area to the sweep area, positioner means including a plurality of sweep arms different adjacent ones of which engage the first and last rows of each group of articles to capture each group therebetween and thereafter conduct each captured group through the sweep area to a pallet loading area for depositing each group as a successive layer on a pallet, and control means for coordinating operation of the device.

It is therefore an object of this invention to provide improved device and method for palletizing articles.

It is another object of this invention to provide improved device and method for palletizing unstable articles such as plastic or glass containers at a speed faster than heretofore possible.

It is still another object of this invention to provide improved device and method for palletizing articles utilizing a movable retainer unit in conjunction with a conveyor unit and a positioner unit having a plurality of movable sweep arms.

It is yet another object of this invention to provide improved device and method for palletizing articles wherein articles are caused to be formed into groups by a retainer unit and conveyed by a conveyor unit and a positioner unit having a plurality of arms for capturing each group of articles and leading and urging each group into position onto a pallet.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a partial perspective view illustrating the device of this invention;

FIGS. 2A and 2B, taken together, form a partial top view of the device shown in FIG. 1 with articles being conveyed through the device added for illustrative purposes;

FIGS. 3A and 3B, 4, 5A with one bottle shown in FIG. 3B for illustrative purposes taken together, form a partial side view of the device shown in FIG. 1;

FIG. 4 is an end view of the device shown in FIG. 1 with a pair of articles added for illustrating purposes;

FIGS. 5A through 5V are sketches illustrating operation of the device of this invention particularly for palletizing unstable articles; and FIGS. 6A through 6P are sketches illustrating an alternate operation of the device of this invention for palletizing unstable articles.

DESCRIPTION OF THE INVENTION

Figure 2A:
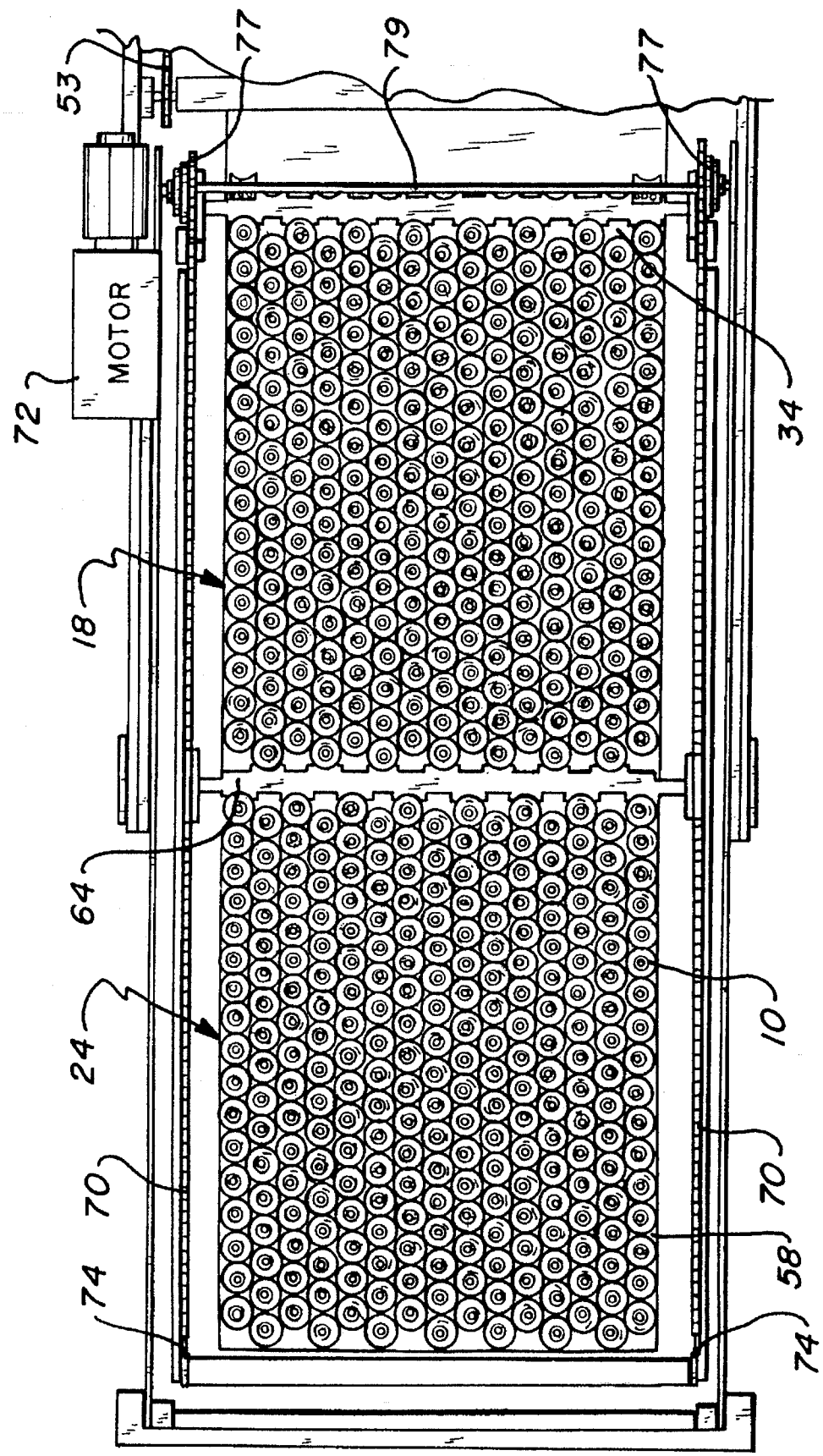

As best shown in FIG. 1, received unstable articles (such as plastic and glass containers 10, illustrated in FIGS. 2A, 2B, 3B, 4, 5A through 5V and 6A through 6P) may be conveyed in single file along single line conveyor 12 to accumulating area 14. The articles are urged from accumulating area 14 by conveyor system 16 toward a sweep area 18 downstream of accumulating area 14, with the articles being retained at accumulating area 14 by retainer unit 20 until led by the retainer unit, by groups, from the accumulating area to sweep area 18, after which each group of articles is conducted by a positioner unit 22 to a pallet loading area, or section, 24 where each group of articles is deposited as a layer on a pallet 26.

While not essential for some uses, it is preferred that articles be arranged in a pattern at accumulating area 14, which pattern is preferably a nested arrangement when the articles are to be stored on pallet 26 by vertical layers with each group forming a separate layer.

To remove voids between articles, a void eliminating unit 28, patterned after the unit shown in U.S. Pat. No. 4,934,508, may be utilized at accumulating area 14. In essence, void eliminator unit 28 causes opposite side rails 29 and 30 to be moved toward and away from one another by a driving mechanism 31 (which mechanism is driven through chain 32, as indicated in FIGS. 1 and 2B) to aid in formation of the nested pattern without voids between the articles.

Conveyor system 16 is formed by a pair of endless belt conveyors 33 and 34 that extend through the downstream portion of accumulating area 14 and the upstream portion of sweep area 18 to receive articles to be conveyed.

As shown, endless belt conveyor 33 extends around rollers 36 and 37 and endless belt conveyor 34 extends around rollers 38 and 39, with the rollers being journaled for rotation on main frame 40. Roller 37 is rotatively driven by electric motor 41, and roller 39 is rotatively driven by electric motor 42 with conveyor 33 being driven at a speed of about 165 feet per minute and conveyor 34 being driven at a speed of about 45 feet per minute so that additional force (by conveyor 33) is placed on articles being conveyed through the device to aid in reducing article tipping and voids between articles and to maintain the articles in engagement with the lead sweep arm (by conveyor 34) as the articles are moved through the sweep area. Motors 41 and 42 are controlled by control unit 44 (control unit 44 is preferably a programmable microprocessor controller).

Retainer unit 20 is positioned at the discharge end of accumulating area 14 when retainer unit 20 is at home position.

As shown, retainer unit 20 includes a plurality of spaced fingers, or plungers, 46 each of which is inserted in front of each leading row of articles 10 extending transversely across the top of endless belt conveyor 34. Sufficient fingers must be provided to assure against passage of articles past the retainer unit when the retainer unit is in the article retaining position with fingers 46 extended (with a nested arrangement, plungers 46 are inserted in front of, or even into, the lead article of every other longitudinally extending row of articles).

As best shown in FIG. 1, plungers 46 are mounted along arm 47, which arm is mounted on brackets 48 to move upwardly and downwardly by means of pneumatic cylinder 49 driving piston 50.

Plungers 46 are lowered in front of articles 10 to establish the retaining position of retainer unit 20 when retainer unit 20 is at home position (as shown, for example, in FIG. 5A) and are raised from articles 10 to allow return of retainer unit 20 to home position after retainer unit 20 has led a group of articles to sweep area 18, with the plungers being again extended to engage a new row of articles when the retainer unit reaches the home position to thereby define a new group of articles.

Retainer unit 20 is driven back and forth (driven in the downstream direction to lead articles from the accumulating area and driven in the upstream direction to return the retainer unit to the home position with the plungers retracted) by electric motor 52 (preferably a servo motor) and chain drive 53 with the retainer unit being mounted on slides 54 for movement between the home position and the sweep area. As best shown in FIGS. 1 and 2B, motor 52 also drives chain 32 to this control operation of void eliminator unit 28 in conjunction with operation of retainer unit 20.

The articles led by retainer unit 20 are conveyed to sweep area 18 by conveyor belt 33 with conveyor belt 33 preferably extending downstream to dead plate 55 (as shown in FIGS. 1 and 3B) positioned between conveyor belts 33 and 34. Conveyor belt 34 extends downstream to dead plate 56 positioned adjacent to hoist 57 (as shown in FIGS. 1 and 3A) used to position pallet 26 so that the pallet is initially raised to a level even with the top surface of dead plate 56 and then lowered each time a layer of articles is placed on the pallet so that the top of the then top layer (preferably with a separator sheet 58 over the top of the layer) is even with the top surface of dead plate 56. The palletizer is preferably a palletizer of the type shown in U.S. Pat. No. 4,759,673.

At sweep area 18, the transverse leading row of articles to form a group to be palletized come into contact with positioner, or sweep, unit 22 and, more particularly, sweep arm 60, and sweep arm 60 leads the group of articles through the sweep area toward pallet 26 with the next adjacent sweep arm 62 coming into contact with the transverse trailing row of the group of articles then to be palletized to remain in engagement with the trailing row while following the group as the group is moved toward the pallet. Positioner unit 22 is shown to include five sweep arms 60, 62, 64, 66 and 68 (which arms are preferably contoured as best shown in FIG. 1) and the sweep arms are mounted on endless chain 70 driven by electric motor 72 (preferably a servo motor) so that the sweep arms are successively moved through the sweep area, with positioner unit 22 extending over dead plate 56 and pallet loading area 24.

While five sweep arms are shown herein, three sweep arms could be utilized for some uses (such as, for example, for more stable articles) where the arms need not lead and push articles throughout the entire positioning of the articles on the pallet. When three sweep arms are utilized, operation is essentially the same as outlined herein for five arms except that the chain path is shorter and the arms are utilized more frequently.

Chain 70 may be wrapped about one or more sprocket wheels and/or guided by an endless loop guide 73 at each side of the device with endless loop guide 73 and sprocket wheels 74, 76, 77 and 78 being illustrated, for example in FIG. 1 and with sprocket wheels 77 at opposite sides of the device being mounted on rod 79 so that sprocket wheels 77 are rotatively driven by electric motor 72 (preferably a servo motor) controlled by control unit 44, preferably through a closed loop servo system.

After sweep arm 60, acting as a lead stabilizer, has led the first group of articles onto pallet 26 and sweep arm 62, acting as a trailing stabilizer, has trailed the articles onto pallet 26, arm 60 is rotated up out of the path of the articles (about sprocket wheel 74 so that arm 60 is thereafter moved rearwardly, i.e., upstream, with respect to article travel) while sweep arm 62 continues to act as a trailing stabilizer and trail the group of articles then being palletized onto pallet 26 until the entire group is deposited on the pallet and arm 62 is moved in the upstream direction a sufficient distance to clear the pallet loading area (at this time another arm has been moved to a home position of the positioner unit). In like manner, adjacent sweep arms are used as leading and trailing stabilizers to position each successive group of articles onto the pallet.

When a palletizer is used as shown in U.S. Pat. No. 4,759,673, the separator sheets are transferred by a sheet transfer unit that lifts the sheets vertically, and, when so lifted, the sweep arms of the sweep unit cannot extend outwardly over the palletizer when sheet transfer is to be accomplished. By utilizing sweep arms as set forth herein and controlling movement of the sweep arms through the sweep area, no portion of the positioner unit is in the pallet loading area whenever any one of the sweep arms is at a home position of the positioner unit so that a satisfactory sweep can be accomplished and the sweep arms do not extend over the palletizer during operations such as sheet transfer.

Control unit 44 is accessible to an operator, and when programmed, controls application of electrical power to the electric motors (driving conveyor belts 33 and 34, retainer unit 20 and positioner unit 22) and controlling application of fluid (normally air) to pneumatic cylinder 49. A sensor (not illustrated) may be utilized to sense the presence of the retainer unit and/or the positioner unit at home position, and additional sensors (not illustrated) may be utilized to sense movement and/or position of the movable portions of each unit and/or article movement thereat for monitoring and/or timing purposes, it being appreciated that the movable portions must operate in the manner and in the sequence as set forth hereinafter. It is also to be appreciated that timing and sequencing could be carried out by a timing unit and associated sensors carrying out the steps of operation as set forth hereinafter.

Operation of the device with a five bar positioner unit and a retainer unit movable over the entire distance from the accumulating area to the pallet (a distance for example of about 56 inches for use in palletizing three inch diameter containers at a rated line speed onto a 44 inches×56 inches pallet with the device having the capability of depositing up to four layers per minute onto the pallet) is shown in simplified form in FIGS. 5A throught 5V as follows: as indicated in FIG. 5A, positioner unit 22 is at a home position, (the arms of positioner unit 22 have been moved from the positioning of the arms as shown in FIG. 3A so that when the positioner unit is in the home position none of the arms are over the pallet loading area, and, more particularly, as indicated in FIG. 5A, arm 68 is centered over dead plate 56 and arm 66, while rotated, is still outside the pallet loading area retainer unit 20 is also at the home position with plungers 46 in the retaining (extended) position, and conveyor belts 33 and 34 are operating continuously at their designated speeds, a preselected number of articles to form a group of such articles have been deposited as a complete layer (the deposited layer depicted in FIG. 5A is arbitrarily the layer intended to be the second layer from the top of a vertically stacked plurality of layers on the pallet with the lower layers not being illustrated), and additional articles have been conveyed by conveyor belt 33 toward retainer unit 20 where the articles have been retained by retainer unit 20 and formed into a nested relationship at the accumulating area upstream of the retainer unit; as indicated in FIG. 5B, retainer unit 20 has been moved in the downstream direction from the accumulating area (with the plungers extended to maintain engagement with and lead the articles) to a position adjacent to the sweep area to allow the lead row of articles to make contact with sweep bar 60 of the positioner unit (during this movement, the retainer unit has been moved downstream at a speed of about 7 ½ feet per minute to travel about 56 inches with the positioner unit not moving); as indicated in FIG. 5C, retainer unit 20 (with the plungers withdrawn so that the plungers are not engagable with articles) has been moved upstream (at a speed of about 30 feet per minute) to the home position of the retainer unit and the plungers have again been extended to define a new group of articles between the plungers and sweep arm 60 (which has been moved downstream to allow the articles behind sweep arm 60 to be urged in the downstream direction by conveyor belt 34 with sweep arm 60 having been moved a sufficient distance prior to extension of the plungers to ensure that the group of articles between the plungers and sweep arm 60 is the predetermined number of articles required for the next layer to be placed on the pallet); as indicated in FIG. 5D, as sweep arm 60 continues to move downstream (at a speed of about 30 feet per minute), the group of articles to form the top layer on the pallet are urged downstream by conveyor belt 34, while retainer unit 20 retains, or holds back, additional articles at accumulating area 14 that will be used to form the first layer on a new pallet; as indicated in FIG. 5E, as sweep bar 60 continues to move downstream (with the group behind sweep bar 60 being urged downstream by conveyor belt 34 so that sweep bar 60 leads this group), sweep bar 62 is now approaching the last row of the group of articles being led downstream by sweep bar 60, and retainer unit 20 is still retaining the additional articles at the accumulating area; as indicated in FIG. 5F, as sweep bar 60 continues to move downstream and reaches dead plate 56 (with the group being urged downstream by conveyor belt 34 so that sweep bar 60 continues to lead the group downstream), sweep arm 62 comes into engagement with the last row of articles of the last group to be deposited on the pallet so that the entire group is captured between sweep arms 60 and 62, with retainer unit 20 remaining at the home position to prevent additional articles from moving downstream; as indicated in FIG. 5G, the group of articles to form the top layer on the pallet continues to be urged downstream by conveyor belt 34 with the group being led by sweep arm 60 and with sweep arm 62 remaining in engagement with the last row of the group so that the captured group is moved across dead plate 56 and over the separator sheet covering the next to the top layer of articles, while retainer unit 20 continues preventing additional articles to be moved downstream from the accumulating area; as indicated in FIG. 5H, as the rear row of the top layer of articles reaches dead plate 56, only sweep arm 62 further urges the articles in the downstream direction, and retainer unit 20 continues preventing movement of articles in the downstream direction from the accumulating area; as indicated in FIG. 5I, the top layer of articles is now positioned on the pallet and arm 60 has been rotating upwardly about sprocket 74 (and hence is outside the pallet loading area) while arm 62 is over the dead plate (and hence not over the pallet loading area) to thus ensure that the sweep arms will not interfere with pallet change or separator sheet deposit, the next sweep arm 64 has now also reached a home position of the positioner unit, the positioner unit is stopped, and the retainer unit remains in the home position; and, as indicated in FIG. 5J, the positioner unit is its home position, the retainer unit has moved forward to a position adjacent to the positioner unit, and maintained stopped in the pallet now filled with layers of articles has been removed from the palletizer.

While a new pallet is being positioned to accept layers of articles, retainer unit 20 is moved downstream and a new first group of articles from the accumulating area to the sweep area where the lead row of articles comes into contact with sweep arm 64, after which the retainer unit has withdrawn the plungers and the unit is returned to the home position and the plungers again extended, as indicated in FIG. 5K, with sweep arm 64 having been moved downstream a sufficient distance to define the new first layer between the plungers and sweep arm 64; as indicated in FIG. 5L, as sweep arm 64 continues to move downstream, the last row of the group that is to form the first, or bottom, layer on the pallet is urged away from the retainer unit (which retains articles upstream from the retainer unit from moving downstream) by conveyor belts 33 and 34, and sweep bar 66 has now rotated downwardly to engage the last row of the group of articles that is to form the first, or bottom, layer on the pallet; as indicated in FIG. 5M, retainer unit 20 has started to move downstream before sweep arm 64 (leading the first group) reaches dead plate 56 so that when arm 64 reaches dead plate 56, the second group of articles to form the second layer on the pallet have been led by retainer unit 20 (with the articles being urged in the downstream direction by conveyor belt 33) part way to the sweep area; and, as indicated in FIG. 5N, if the new pallet is not yet then in place, the positioner unit is stopped with sweep arm 64 at dead plate 56 and retainer unit 20 has led the second group of articles to the sweep area after which retainer unit 20 is stopped (with the plungers in the extended position engaging the front row of articles upstream of the retainer unit that will form the third group of articles.

With a new pallet 22 in place, as indicated in FIG. 5P, and with the first layer of articles captured between sweep arms 64 and 66, the palletizer is now ready to stack groups of articles, by vertically extending layers, onto the pallet; as indicated in FIG. 5Q, the first group of articles is urged downstream by conveyor belt 34 and led onto the pallet by sweep arm 64 with sweep arm 66 in trailing engagement with the first group as well as leading the second group (with conveyor belts 33 and 34 urging the second layer in the downstream direction, and retainer unit 20 has been moved back to the home position and the plungers extended to retain articles at the accumulating area and defines the second group of articles between the retainer unit and sweep arm 66; as indicated in FIG. 5R, after the first group of articles has been deposited on the pallet as the first layer, sweep arm 64 has rotated from the pallet loading area and sweep bar 66 is at the dead plate ready to lead the second group of articles onto the pallet to form the second layer thereon (there is now clearance to allow a separator sheet to be inserted over the first layer) and sweep bar 68 has now moved to a home position of the positioner unit, while retainer unit 20 remains at the home position preventing downstream movement of articles from the accumulating area; as indicated in FIG. 5S, after the pallet has been lowered, the second group of articles can now be moved onto the pallet to form the second layer over the first layer, the positioner unit remains stopped in a home position, and retainer unit 20 has now been started to allow articles to be urged by conveyor belt 33 in the downstream direction so that the retainer unit leads articles to form the third group from the accumulating area; as indicated in FIG. 5T, as sweep bar 66 leads the second group onto the pallet with the articles being urged downstream by conveyor belt 34, retainer unit 20 continues to move the third group toward the sweep area due to urging by conveyor belt 33; as indicated in FIG. 5U, just prior to the second group of articles being fully positioned on the pallet as the second layer, sweep arm 60 is now being rotating toward a home position of the positioner unit, and retainer unit 20 continues to lead the third group of articles toward the sweep area with the articles being urged downstream by conveyor belts 33 and 34; and, as indicated in FIG. 5V, at completion of deposit of the second layer on the pallet, sweep arm 60 is now at a home position of the positioner unit ready to engage the front row of the third group of articles being led to the sweep area by retainer unit 20 (with the articles still being urged downstream by conveyor belts 33 and 34 to thereby complete a cycle of movement of the positioner unit.

Operation of the device is continued in the same manner until the pallet is filled with the desired number of layers, after which a new pallet is positioned in the same manner as brought out above.

An alternate embodiment of the operation of the invention is depicted in simplified form in FIGS. 6A through 6P. This embodiment is particularly useful in palletizing articles that have some degree of stability but are still prone to tipping when moved. In this embodiment, a five bar positioner unit has been utilized in conjunction with a movable retainer unit and a conveyor belt that extends through a portion of the accumulating area as well as through a portion of the sweep area. In this embodiment, however, the retainer unit travels a shorter distance in the downstream direction than does the retainer unit described above and may preferably be pneumatically powered (in this embodiment the retainer unit moves downstream about 18 inches, whereas the retainer unit described above moves downstream about 56 inches).

FIG. 6A depicts the alternate embodiment with the top layer positioned on the pallet and the positioner unit and retainer unit in home position; FIGS. 6B through 6G depict the alternate embodiment during pallet change and device operation prior to a new pallet being in position (FIGS. 6B through 6G thus correspond to FIGS. 5I through 5N which likewise depict pallet change and operation prior to a new pallet being in position); FIGS. 6H through 6K depict normal operation in transferring groups of articles to a pallet to form layers of articles thereon (FIGS. 6H through 6K thus correspond to FIGS. 5P through 5U which depict normal operation in transferring groups of articles to a pallet to form layers of articles thereon); and FIGS. 6L through 6P depict operation of the device when a shortage of articles occurs at the accumulating area.

In essence, the device of the alternate embodiment; operates in the same manner as does the device first described above, except that since the retainer unit has a shorter distance of downstream travel, the articles must move further along the sweep area in order for the retainer unit to be able to properly establish each group (each group is established by extending the plungers with the retainer unit at home position and this requires the sweep arm leading the group to be further downstream).

With respect to operation when a shortage of articles occurs at the accumulating area, the retainer unit is maintained at the home position with the plungers extended to prevent article movement downstream from the accumulator area (as indicated in FIGS. 6L through 6N) until sufficient articles are again at the accumulator area (as indicated in FIG. 6P) after which the device resumes normal operation.

As can be appreciated from the foregoing, this invention provides improved method and apparatus for palletizing articles and is particularly useful for higher speed palletizing of unstable articles such as glass or plastic containers.

What is claimed is:

1. A device for palletizing articles, said device comprising:

accumulating means at an accumulating area for receiving articles to be palletized, said accumulating area having a discharge end for discharging articles therefrom in a downstream direction;

a retainer unit movable in said downstream direction from a home position adjacent to said discharge end of said accumulating area, said retainer unit having retaining means separately movable with respect to movement of said retainer unit in said downstream direction with said retaining means being movable to an extended position to engage articles at said discharge end of said accumulating area for preventing downstream movement of said articles from said accumulating area when said retainer unit is at said home position and said retaining means, while in said extended position, leading said articles from said accumulating area when said retainer unit is moved in said downstream direction away from said accumulating area;

conveyor means for urging articles in said downstream direction from said accumulating area;

pallet positioning means for positioning a pallet to receive articles thereon; and a positioner unit having a plurality of sweep arms operable within at least a sweep area downstream from said accumulating area for engaging articles led from said accumulating area by said retaining means and positioning said articles on said pallet.

2. The device of claim 1 wherein said device includes single line conveying means for conveying articles to said accumulating means in single file.

3. The device of claim 1 wherein said device includes void eliminator means having movable article contact rails at said accumulating area for eliminating voids between adjacent articles at said accumulating area.

4. The device of claim 1 wherein said articles have a downstream length, and wherein said retainer unit moves a distance downstream at least equal to said downstream length of said articles in moving from said home position to said sweep area.

5. The device of claim 1 wherein said retainer unit moves a distance downstream of about 56 inches when moving from said home position to said sweep area.

6. The device of claim 1 wherein said articles have a downstream length, and wherein said retainer unit moves a distance downstream at least as great as said downstream length of a plurality of said articles in moving from said home position to said sweep area.

7. The device of claim 1 wherein said retainer unit moves a distance downstream of about 18 inches when moving from said home position to said sweep area.

8. The device of claim 1 wherein said retaining means is movable from said extended position to a retracted position with said retaining means being in said retracted position during movement of said retaining unit from said sweep area to said home position to preclude article engagement during said movement from said sweep area to said home position.

9. The device of claim 1 wherein said conveyor means includes first and second conveying sections with said first conveying section being upstream from said retainer unit and said second conveying section being downstream from said retainer unit when in said home position, said first conveying section moving at a higher speed than said second conveying section and said second conveying section moving at a higher speed in said downstream direction than said retainer unit and said sweep arms of said positioner unit.

10. The device of claim 1 wherein said positioner unit includes five sweep arms.

11. The device of claim 1 wherein different adjacent ones of said plurality of sweep arms of said positioner unit engage opposite sides of each group of articles led from said accumulating area by said retainer unit whereby said sweep arms engaging said articles capture said articles therebetween and move said articles to said pallet as a captured group.

12. The device of claim 1 wherein different ones of said plurality of sweep arms of said positioning unit are brought to a home position prior to said retaining unit leading said articles to said home position, and wherein the remainder of said plurality of sweep arms are positioned to be outside the area where articles are deposited on the pallet whenever any one of said sweep arms is at said home position.

13. A device for palletizing articles, said device comprising;

accumulating means at an article accumulating area for receiving articles to be palletized, said accumulating area having a discharge end for discharging articles from said accumulating area in a downstream direction;

a retainer unit movable in said downstream direction between a home position adjacent to said accumulating area and a second position adjacent to a sweep area, said retainer unit including plunger means movable between extended and retracted positions with said plunger means, when in said extended position, being engagable with articles at said discharge end of said accumulating area for preventing downstream movement of said articles from said accumulating area while said retainer unit is at said home position, said plunger means, while in said extended position, leading articles from said accumulating area when said retainer unit is moved downstream to said second position adjacent to said sweep area, and said plunger means being moved to said retracted position when said retainer unit is returned to said home position from said second position adjacent to said sweep area;

a positioner unit having a plurality of sweep arms operable at least within said sweep area for engaging articles led to said sweep area by said retainer unit and conveying said articles by groups to a pallet loading section of said sweep area;

conveyor means at said accumulating area and said sweep area for urging articles in said downstream direction; and control means for controlling operation of said retainer means between said home and second positions and movement of said plunger means between said extended and retracted positions whereby said retainer unit repeatedly leads a like group of articles from said accumulating area to said sweep area each time that said retainer unit is moved from said home position to said second position, and for controlling said positioner unit whereby said positioner unit repeatedly conveys said articles by said groups to said pallet loading section of said sweep area.

14. The device of claim 13 wherein said accumulating means receives said articles in a nested arrangement, and wherein said groups of articles are deposited on said pallet in nested relationship.

15. The device of claim 13 wherein said retainer unit is moved in said downstream direction at a speed slower than that of said conveyor means, and wherein said conveyor means moves said articles at a speed greater than said sweep arms of said positioner unit.

16. The device of claim 13 wherein said positioner unit includes five sweep arms.

17. The device of claim 16 wherein different adjacent ones of said five sweep arms of said positioner unit engage opposite sides of each said group led to said sweep area by said retainer unit to capture each said group between said adjacent sweep arms engaging the opposite sides of each said group and thereafter moving each said group while so captured to said pallet loading section.

18. A device for palletizing articles, said device comprising:

accumulating means at an article accumulating area for receiving articles to be palletized, said accumulating area having a discharge end for conveying articles therefrom in a downstream direction;

a retainer unit movable between a home position and a second position adjacent to a sweep area, said retainer unit having a plurality of plungers movable between an extended position and a retracted position with said plungers, when extended, being engagable with articles when said retainer unit is at said home position for preventing said articles from passing by said plungers in said downstream direction, and said retainer unit, with said plungers extended, leading articles from said accumulating area to said sweep area as said retainer unit is moved in said downstream direction;

a positioner unit at said sweep area, said positioner unit having a plurality of movable sweep arms spaced from one another a distance such that one of said sweep arms is engagable with said articles led by said retainer unit to said sweep area to lead said articles through said sweep area and another of said sweep arms is engagable with said articles while said articles are being led through said sweep area by said one sweep arm whereby said articles are captured by groups between different ones of said sweep arms during conveying of said groups to a pallet loading area;

conveying means for urging articles in said downstream direction from said accumulating area and said sweep area;

pallet positioning means for positioning a pallet at said pallet loading area for receiving said groups of articles in layers thereon; and control means for controlling operation of said retainer unit and said plungers whereby like groups of said articles are formed and conveyed to said sweep area by said retainer unit and for controlling said positioner unit so that different ones of said sweep arms engage said groups of articles to capture each said group therebetween and maintain each said group captured until said group is deposited on said pallet.

19. The device of claim 18 wherein said positioner unit includes five sweep arms, and wherein different adjacent ones of said sweep arms capture different groups of said articles.

20. The device of claim 19 wherein said sweep arms are mounted on an endless chain so that different ones of said sweep arms are successively brought to a home position in order to capture said groups of articles.

21. A method for repeatedly palletizing groups of articles, said method comprising:

providing articles at an accumulating area with each of said articles having a downstream length;

providing a retainer unit for repeatedly allowing a group of said articles to move in a downstream direction from said accumulating area to a sweep area with each said group being led from said accumulating area to said sweep area by said retainer unit with said retainer unit being moved a distance in said downstream direction at least as great as said downstream length of a plurality of said articles of said group of articles; and providing sweep means at said sweep area to engage each said group of articles and convey each said group to a pallet loading area for repeatedly forming layers of articles on a pallet at said pallet loading area.

22. The method of claim 21 wherein said method includes forming articles at said accumulating area into a nested arrangement with substantially no voids between adjacent articles, and wherein each said group of articles conveyed to said pallet loading area has the articles of each said group in nested relationship.

23. The method of claim 21 wherein each said group of articles to be deposited on said pallet at said pallet loading area has a predetermined length, and wherein said method includes moving said retainer unit a distance in said downstream direction at least equal to said predetermined length of each said group of articles deposited on said pallet at said pallet loading area.

24. The method of claim 21 wherein said method includes moving said retainer unit a distance of about 56 inches when moved from said accumulating area to said sweep area.

25. The method of claim 21 wherein said method includes moving said retainer unit a distance of about 18 inches when moving from said accumulating area to said sweep area.

26. The method of claim 21 wherein said method includes providing first and second conveying means for urging said groups of articles in said downstream direction with said first conveying means urging said groups of articles from said accumulating area and said second conveying means urging said groups of articles through said sweep area, and with said first conveying means operating at a speed greater than that of said second conveying means.

27. The method of claim 26 wherein said groups of articles are urged in said downstream direction by said conveying means at a faster speed than said groups of articles are led by said retainer unit from said accumulating area and by said positioner unit through said sweep area.

28. The method of claim 21 wherein said method includes providing five sweep arms for engaging said groups of articles and conveying each group to said pallet loading area.

29. The method of claim 21 wherein said method includes providing sweep means having a plurality of sweep arms, and utilizing said plurality of sweep arms to capture each said group between adjacent ones of said sweep arms, and conveying said groups to said pallet loading area while so captured between said sweep arms.

* * * * *